W. O. FOSS.
SPEED CHANGING MECHANISM.
APPLICATION FILED SEPT. 11, 1908.

928,648.

Patented July 20, 1909.

Witnesses

Inventor
Walter O. Foss
by H. B. Schermerhorn
Attorney

UNITED STATES PATENT OFFICE.

WALTER O. FOSS, OF PHILADELPHIA, PENNSYLVANIA, ASSIGNOR TO FREDERICK C. BRUNHOUSE, OF PHILADELPHIA, PENNSYLVANIA.

SPEED-CHANGING MECHANISM.

No. 928,648.    Specification of Letters Patent.    Patented July 20, 1909.

Application filed September 11, 1908. Serial No. 452,666.

*To all whom it may concern:*

Be it known that I, WALTER O. Foss, a citizen of the United States, residing at No. 137 North Fifty-ninth street, in the city and county of Philadelphia and State of Pennsylvania, have invented a new and useful Speed-Changing Mechanism, of which the following is a specification.

My invention relates to speed changing mechanisms designed primarily but not exclusively for automobile use, and my object is to provide a mechanism of this character which shall combine in a simple and compact form the mechanism for the forward speeds and for the reverse. This I accomplish by the means hereinbelow described, and illustrated in the accompanying drawings, in which—

Figure 1:
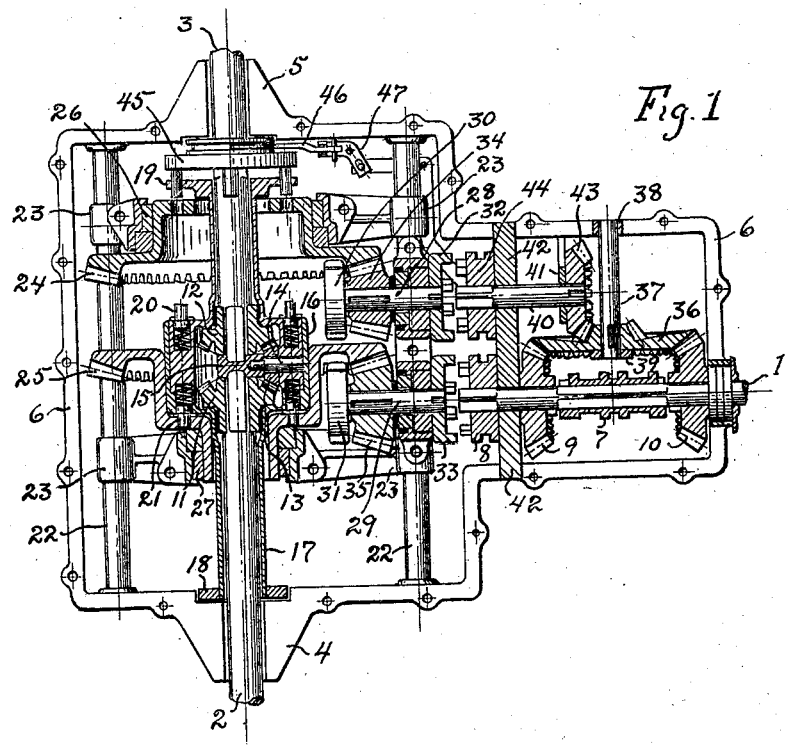
Figure 2:
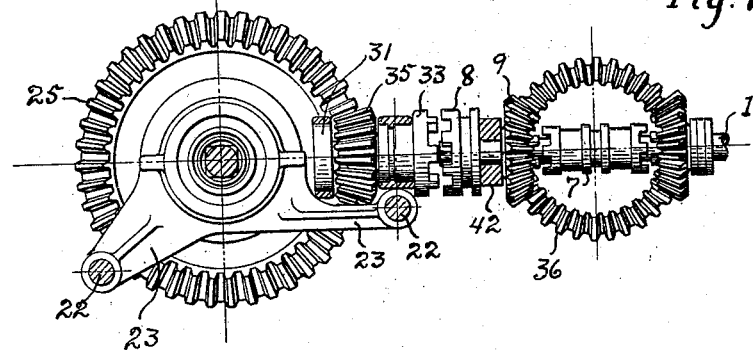

Figure 1 is a view in plan of the entire mechanism, and Fig. 2 is a view in elevation of a portion of said mechanism.

In Fig. 1, 1 is the driving or power shaft and 2, 3 the two sections of the driven shaft or axle, the two sections of the latter being connected, for automobile use, by a differential and being mounted in suitable bearings 4, 5 in the gear casing 6.

Upon the driving shaft 1 are slidably mounted the driving members 7 and 8, both of which may be either mounted upon squared sections of the shaft, as shown, or splined thereon in the ordinary manner. The driving shaft also carries the gears 9 and 10 mounted free thereon. The meeting ends of the sections 2, 3 are squared and are furnished with the gears 11 and 12. The idler 13 is mounted between the gears 11 and 12, one end of its pin or pivot 14 being mounted in the bearing 15 located between the meeting ends of the driven shaft, and the other in the differential gear case 16. The latter is formed with tubular extensions 17 inclosing the sections of the driven shaft and terminating at one end in a bearing 18 in the gear case 4, and at the other in an enlarged and perforated head 19. The differential gear case 16 has two sets of spring-pressed clutch pins, 20 and 21, facing in opposite directions.

The means whereby power is transmitted from the driving to the driven shaft are as follows: Upon the parallel supports 22 secured to the gear case 6 is slidably mounted a frame 23 which carries the annular driving gears 24 and 25 mounted in the bearings 26 and 27 in the frame 23. The annular driving gears 24 and 25 are formed with recessed or counter sunk barrels adapted to fit over either end of the differential gear case 16, and are furnished with clutch seats 60 to receive the spring-pressed clutch-pins 20 and 21. The slidable frame 23 also carries the shafts 28 and 29 mounted in suitable bearings in the frame and being further provided with the collar bearings 30 and 31 to support the inner ends of said shafts. The shafts 28 and 29 carry the driven members 32 and 33 secured upon their outer ends, and the bevel gears 34 and 35 secured upon their inner ends and adapted to engage the driving gears 24 and 25. The gear 36, furnished with teeth upon both its periphery and its barrel is keyed upon the shaft 37, one end of which has a bearing 38 in the gear case 6 while the other is supported in a bearing in the bracket 39. The shaft 40 is supported in bearings in the brackets 41 and 42, integral with the gear case 6, the bracket 42 likewise furnishing a bearing and a support for the power shaft 1. Upon one end of the shaft 40 is keyed the bevel gear 43, and upon the other end is slidably mounted the driving member 44. The bevel gear 43 engages the gear upon the barrel of the gear 36, while the latter engages at its periphery both bevel gears 9 and 10 upon the power shaft 1. The driving member 45 is slidably mounted upon section 3 of the driven shaft, being either mounted upon a squared section thereof or splined thereon, and is actuated by the clutch fork 46 and jointed lever 47.

Having thus set forth the component elements of my improved speed changing mechanism, I will now describe its mode of operation: In the position of parts shown in Fig. 1 no transmission of power from the driving to the driven shaft can take place, but we are in position to make connection for the high speed forward. This is done by throwing driving member 8 into positive contact with driven member 33, thus coupling shafts 1 and 29 and transmitting the revolution thereof through gears 35 and 25 to the differential gear case 16, which is locked to gear 25 by the spring-pressed clutch pins 21. Thence, power is transmitted to the two sections of the driven shaft through the idler 13 which is mounted in the differential gear case and which meshes with the gears 11 and 12 on the squared end sections of the driven shaft. In order to run on the intermediate forward speed the driving member 8 is withdrawn, and the frame 23 is slid along upon its supports 22, carrying with it the gears 24, 25, 34 and 35 and the driven members 32 and 33, until the driven member 32 is brought into alinement with driving member 8 on the power shaft. The above described movement of the frame 23 with its mechanism withdraws the base of gear 25 from the spring-pressed clutch pins 21 and brings the base of gear 24 into contact with the spring-pressed clutch pins 20, whereupon the latter enter the seats in the base of gear 24 which is thereby locked to the driven shaft. Driving member 8 is then thrown into positive contact with driven member 32, and the transmission of power from the driving to the driven shaft takes place through gears 34 and 24 in a manner identical with that hereinabove described for the high speed transmission. In order to return to the high speed forward the direction of movement of the frame 23 is reversed, the driving member 8 being disconnected and reconnected as above described. Any suitable system of levers (not shown) may be employed to effect the to-and-fro movement of the frame with its mechanism. To obtain the low speed forward, the position of parts being as shown in Fig. 1, the double headed driving member 7 is thrown into positive contact with bevel gear 10 and driving member 44 is thrown into positive contact with driven member 32. The gear 24 is then rendered positive by throwing on driving member 45. Transmission from the power shaft 1 to the driven shaft then takes place through gears 10, 36, 43, 34 and 24. In the case of the high, intermediate and low speeds, the ratio of the rate of revolution of the driving and driven shafts is determined by the ratio of the gears employed in each instance.

The reverse is operated as follows: The position of parts being as shown in Fig. 1, the double-headed driving member 7 is thrown on bevel gear 9, and driving members 44 and 45 are also thrown into engagement. It is then apparent that the power shaft 1 and gear 9 transmit, through the same means hereinabove described for the low forward speed, a reverse direction of revolution to the driven shaft.

The clutch pins of the differential gear case are spring-pressed in order that when either of the gears 24 or 25 are brought into contact with said pins, the differential gear case being in revolution, the pins shall enter their seats in said gears as soon as the pins are brought opposite said seats.

What I claim as my invention and desire to secure by Letters Patent is—

1. In a speed-changing mechanism, a two-part driven shaft, gears upon the meeting ends of said shaft parts, a bevel gear mounted between and engaging both of said gears, a gear case; spring-pressed clutch pins mounted therein, gears adapted to be engaged by said clutch pins, a driving shaft and means for positively connecting said driving shaft to either of said gears, substantially as described.

2. In a speed-changing mechanism, a two-section driven shaft, gears upon the meeting ends thereof, an idler mounted between and engaging both of said gears, a gear case rotating with said driven shaft, spring-pressed clutch pins mounted in said case, gears furnished with clutch seats adapted to be moved into engagement with said clutch pins, a driving shaft and means for actuating either of said gears from said driving shaft, substantially as described.

3. In a speed-changing mechanism, a driven shaft formed in two sections, a differential mechanism connecting the sections of said driven shaft and consisting of bevel gears mounted on the meeting ends of said sections and an idler mounted between and engaging both of said bevel gears, a differential case inclosing said differential mechanism and rotating with said driven shaft, spring pressed clutch pins mounted in said differential case, a slidable frame, gears carried thereby and furnished with clutch seats adapted to receive said clutch-pins, a power shaft, and means for actuating either of said gears from said power shaft, substantially as described.

WALTER O. FOSS.

Witnesses:
F. C. BRUNHOUSE,
H. B. SCHERMERHORN.